United States Patent Office 3,044,996
Patented July 17, 1962

3,044,996
PROCESS FOR POLYMERIZING UNSATURATED
ALDEHYDES
Edward C. Shokal, Walnut Creek, Calif., assignor to
Shell Oil Company, a corporation of Delaware
No Drawing. Filed Apr. 14, 1958, Ser. No. 728,029
7 Claims. (Cl. 260—80)

This invention relates to the polymerization of unsaturated aldehydes. More particularly, the invention relates to process for polymerizing ethylenically unsaturated aldehydes to form soluble infusible polymers and to the utilization of these polymers, particularly in the preparation of resinous polyhydric alcohols.

Specifically, the invention provides a new and highly efficient process for polymerizing alpha,beta-ethylenically unsaturated aldehydes, such as acrolein to form soluble fusible polymers that may be easily converted to resinous polyhydric alcohol. This process comprises containing the monomeric alpha,beta-ethylenically unsaturated aldehydes with a catalytic amount of an organo-metallic compound of a group consisting of organo substituted phosphines, arsines and phosphites; preferably, in a solvent containing at least 1 OH group.

This application is a continuation-in-part of my application Serial No. 464,590, filed October 25, 1954, now Patent Number U.S. 2,840,617.

It is known that unsaturated aldehydes, such as acrolein, may be polymerized by the addition of bases, such as sodium hydroxide and sodium carbonate. Little use for these polymers as such has been found, however, and considerable effort has been put forth to try and convert the polymers to more useful products. Attempts have been made, for example, to hydrogenate the polymers to form polymeric polyhydric alcohols. These attempts have not been successful, however, because the aldehyde polymers produced by these methods have been resistant to hydrogenation and/or have been depolymerized in the presence of the hydrogen. Some polymeric polyhydric alcohols have been prepared from the unsaturated aldehydes (Evans—U.S. 2,478,154), but in this case it was first necessary to form a polymer of an ester derivative of the aldehyde, subject the polymer to hydrolysis and then hydrogenate the resulting polymeric aldehyde. This indirect method is obviously not economically attractive.

It is an object of the invention to provide method for polymerizing unsaturated aldehydes. It is a further object to provide a method for polymerizing unsaturated aldehydes to form polymers which may be easily hydrogenated to form valuable polymeric polyhydric alcohols. It is a further object to provide a new method for polymerizing alpha,beta-ethylenically unsaturated aldehydes, such as acrolein. It is a further object to provide a new method for polymerizing alpha-beta-ethylenically unsaturated aldehydes to form soluble fusible crystal clear polymers. These and other objects of the invention will be apparent from the following detailed description thereof.

It has now been discovered that these and other objects may be accomplished by the process of the invention which comprises contacting the monomeric alpha, beta-ethylenically unsaturated aldehydes with a controlled amount of an organo metallic catalyst of the group consisting of organo-substituted phosphines, arsines and phosphites, preferably in the presence of a solvent containing at least one OH group.

When the unsaturated aldehydes are contacted with these special catalytic materials, they rapidly polymerize to form soluble fusible crystal clear polymeric products which are surprisingly easy to hydrogenate to form polymeric polyhydric alcohols. Polyacrolein formed in the presence of these catalysts can, for example, be easily hydrogenated to form polyallyl alcohol having high OH values such as e.g., about .5 to 1.0 eq./100 g. In addition the polyols formed by this method easily undergo further reaction, such as esterfication, to form many useful and valuable products. The polyols are, for example, easily cooked with polybasic acids or anhydrides to form valuable alkyd resins which may be used in baking enamels, varnishes and the like.

The catalysts used in the polymerization of the alpha, beta-ethylenically unsaturated aldehydes are members of the group consisting of organo-substituted phosphines, arsines and phosphites. The substituted phosphines useful as catalysts are those of the formula $P(R)_3$ wherein at least one R is an organic radical and the other R's may be hydrogen or organic radicals. Particularly preferred phosphines include the trihydrocarbyl phosphines, the dihydrocarbyl phosphines and monohydrocarbyl phosphines, such as tricyclohexyl phosphines, 3,3,5-trimethylcyclohexyl phosphine, triphenyl phosphine, trioctyl phosphine, diphenyl cyclohexyl phosphine, tributyl phosphine, trihexenyl phosphine, trixyxyl phosphine, triethyl phosphine, dicyclohexyl phosphine, tridodecyl phosphine, tricyclohexenyl phosphine, cyclohexyl phosphine and trihexyl phosphine. Particularly preferred phosphines include the trialkyl, the tricycloalkyl, the tri(alkylcycloalkyl), the triaryl and tri(alkaryl) phosphines and particularly those wherein each akyl, cycloalkyl, alkylcycloalkyl, aryl and alkaryl radicals contain no more than 12 carbon atoms, and especially not more than 9 carbon atoms.

The organo-substituted arsines useful as catalysts are those of the formula $As(R)_3$ wherein at least one R is an organic radical and the other R's may be hydrogen or organic radicals. Particularly preferred arsines include the trihydrocarbyl arsines, the dihydrocarbyl arsines, and the monohydrocarbyl arsines, such as trixylylarsine, triethyl arsine, dicyclohexyl arsine, trihexenyl arsine, tri-3,3,5-trimethyl cyclohexyl phosphine, tricyclohexenyl arsine, and trihexyl arsine. Particularly preferred arisines include the trialkyl, tricycloalkyl, tri(alkylcycloalkyl), triaryl and trialkaryl arsines and particularly those wherein each alkyl, cycloalkyl, alkcycloalkyl and aryl and alkaryl radicals contain no more than 12 carbon atoms and especially not more than 9 carbon atoms.

The substituted phosphite useful as catalysts are preferably those of the formula

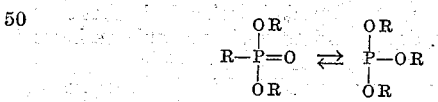

wherein at least one R is an organic radical and the other R's may be hydrogen or organic radicals. Preferred phosphites include the trihydrocarbyl, dihydocarbyl and monohydrocarbyl phosphites, such as tricyclohexyl phosphite, triphenyl phosphite, triethyl phosphite, tridecyl phosphite, trioctadecyl phosphite, triallyl phosphite, tricyclohexenyl phosphite, trixylyl phosphite, triisohexyl phosphite, tri-(2,3-dibutylcyclohexyl) phosphite, trioctadecenyl phosphite, diphenyl hydrogen phosphite, diphenyl cyclohexyl phosphite, methyl butyl phosphite, dicyclohexyl hydrogen phosphite, diallyl hydrogen phosphite, allyl phosphite and octyl phosphites. Particularly preferred phosphites include the trialkyl, tricycloalkyl, tri(alkcycloalkyl) triaryl phosphites and tri-alkaryl) phosphites and particularly those wherein each alkyl, cycloalkyl, alkcycloalkyl, aryl and alkaryl radicals contains no more than 12 carbon atoms and especially no more than 9 carbon atoms.

The amount of catalyst employed in the polymerization of the unsaturated aldehydes may vary over a considerable range. The amount may range from as low as 0.01% to as high as 10% or more of the total weight of the monomer being polymerized. In most cases, however, amounts of catalyst varying from .1% to 5% by weight of monomer are sufficient to effect a rapid reaction and this is the preferred range to be employed.

The polymerization may be carried out at temperatures ranging from about −50° C. to 250° C. Temperatures below about 0° C. are seldom employed, however, and the reaction is preferably conducted at temperatures ranging from 0° C. to 100° C. In many cases, there may be a slight induction period in which no activity is shown and then the reaction may take place very rapidly. In this case, it may be desirable to employ relatively high temperatures at the beginning to lessen the induction period, and then remove the heat after the reaction has commenced.

It is preferred to conduct the polymerization in a solvent, such as, for example, benzene, toluene, ethanol, methanol, dioxane, acetonitrile, isopropyl ether, acetone-water mixtures, and the like. The polymerization is preferably accomplished in the presence of liquids containing at least one OH group, such as, for example, water, ethanol, propanol, ethylene glycol, diethylene glycol, methanol, isopropanol, butanol and the like and mixtures thereof. Alkanols preferably containing from 1 to 6 carbon atoms are particularly preferred. Polymers formed in the presence of these materials are particularly easy to hydrogenate. When polymerization is conducted in a liquid medium, the concentration of monomer may be varied over a wide range, but is preferably maintained from about 10% to 60% by weight of the liquid employed.

After the polymerization has been accomplished, the polymeric aldehydes may be recovered from the reaction mixture by any suitable means, such as filtration, extraction and the like, and the catalysts removed from the polymer by washing with water or other suitable solvents.

The polymers formed by the above-described process are generally viscous liquids to solids having a molecular weight (determined obullioscopically in tetrachloroethane) of between about 400 to about 4500. The polymers are soluble in organic solvents, such as acetone, benzene, toluene and the like, and are compatible with various natural and synthetic resins. As a polyaldehyde, the polymers may be used as a chemical intermediate for preparation of other valuable organic materials. The polymers find particular application as resinous reactants for epoxy resins, and particularly the polyglycidyl ethers of polyhydric phenols.

The new polymers are especially valuable in that they may be easily hydrogenated to form valuable resinous polyols. The hydrogenation of the above-described aldehyde polymers may be accomplished in the presence or absence of diluents or solvents. In some cases, it may be desirable to employ solvents which are relatively inert to the hydrogenation reaction, such as ethanol, isopropanol, ethylene glycol, dioxane, and the like, and mixtures thereof, to facilitate operation of the process.

Catalysts that are used in the hydrogenation are preferably the metals of groups I, II and VI to VIII of the periodic table of elements, their alloys and derivatives such as their sulfides, oxides and chromites. Examples of suitable catalysts include silver, copper, iron, manganese, molybdenum, nickel, palladium, platinum, chromium, cobalt, rhodium, tungsten, mixtures of the metals, such as copper-silver mixtures, copper-tin mixtures, nickel-cobalt mixtures, and their derivatives, such as copper oxide, copper chromite, nickel sulfide, silver sulfide, nickel chromite, and the like. Particularly preferred catalysts are the members of the group consisting of nickel, copper, cobalt, iron, chromium, silver and platinum, and their oxides, sulfides and chromites. These catalysts may be employed in a finely-divided form and dispersed in and throughout the reaction mixture, or they may be employed in a more massive state, either in essentially the pure state or supported upon or carried by an inert carrier material, such as pumice, kieselguhr, diatomaceous earth, clay, alumina, charcoal, carbon or the like, and the reaction mixture contacted therewith as by flowing the mixture over or through a bed of the catalyst or according to other methods known in the art.

The amount of the catalyst employed may vary over a considerable range depending upon the type of catalyst employed, the specific polymer, etc. In general, the amount of the catalyst will vary from 1% to 30% by weight of the reactants. Preferred amounts of catalyst range from 5% to 10% by weight. The above-noted preferred catalysts are generally employed in amounts varying from 5% to 10% by weight.

Temperatures used during the hydrogenation will be at least above 50° C., and not in excess of 250° C. Particularly preferred temperatures range from 75° C. to 150° C. Hydrogen pressure of at least 50 pounds per square inch may be used, but higher pressures of the order of about 250 to 3000 p.s.i. are generally more preferred. Particularly preferred hydrogen pressures range from about 500 p.s.i. to 2000 p.s.i.

The hydrogenation may be executed in any suitable manner and in any suitable apparatus of the type that is customarily employed for hydrogenation processes. A method of carrying out the process that has been found to be advantageous comprises placing the polymer, solvent and catalyst in a pressure-resistant vessel equipped with the necessary inlets and outlets, heating means, pressure gauge, thermometer, etc., and desirably with means for agitating the contents, and subjecting the resulting mixture to the action of hydrogen gas under the aforedescribed conditions of temperature and pressure in the presence of the catalyst until absorption of hydrogen is for practical purposes complete.

At the completion of the hydrogenation, the polymeric alcohol may be recovered from the reaction mixture by any suitable manner. For example, the hydrogenation catalyst, if dispersed in the reaction mixture, may be removed by filtration, centrifugation, etc. The desired polymeric alcohol may be recovered and purified by any suitable means, such as high vacuum distillation, solvent extraction, and the like.

The polymeric polyhydric alcohols produced by the hydrogenation of the polymeric aldehydes are useful for a great many important applications. They are useful, for example, as sizing materials for textiles, as creaseproof impregnating agents for paper, electroplating bath additives, and the like. They are also useful as chemical intermediates in the preparation of other valuble materials. They may be reacted with aldehydes, for example, to form resinous acetals, with nitric acid to form nitrate explosives, and with unsaturated acids to form drying oils.

The polyols are particularly valuable, however, in the preparation of modified alkyd resins. The polyols impart fast drying and baking characteristics and produce films having good hardness and flexibility.

The invention is illustrated by the following examples. Parts described in the examples are parts by weight unless otherwise noted.

*Example I*

300 parts of ethanol and 3 parts of triphenyl phosphine were mixed in a reaction vessel. The mixture was kept at 40° C.–50° C. and 275 parts of acrolein (made up of a solution containing 40% acrolein, 40% water and 20% ethanol) was slowly added with stirring. The temperature was maintained at 40–50° C. for 1 hour and the mixture then allowed to stand. Removal of the ethanol and water yielded a yellow solid.

About 100 parts of the polyacrolein prepared above is mixed with ethanol and treated with hydrogen at 100° C. and 1000 p.s.i. pressure in the presence of Raney nickel. During the first 3 hours, hydrogen is rapidly absorbed and about 70% of the calculated amount of hydrogen is reacted. Hydrogenation is continued for another 10 hours until about 100% of the calculated amount of hydrogen is absorbed. At that time, the product is all soluble in the ethanol. The mixture is then removed from the hydrogenation vessel, filtered, and topped at 150° C., 1 mm., to give a viscous semi-solid resin having an OH value of about 1.0 eq./100 g. The polyol has a molecular weight of 407 and an ester value of 0.019 eq./100 g.

The polyol produced above is then reacted with an equivalent amount of phthalic anhydride, 50% by weight of the acid and polyol of soya bean fatty acids to form a resinous polyester which could be used to form baked films which were very hard and tough.

*Example II*

300 parts of ethanol and 0.5 part trixylyl phosphine were mixed in a reaction vessel. The mixture was kept at 25° C. and 200 parts of acrolein slowly added with stirring. The temperature began to rise but was kept between 25° C.–40° C. The mixture was allowed to stand overnight and then distilled under vacuum to remove the ethanol. The resulting product was a light yellow colored solid.

*Example III*

1.0 part of tris(3,3,5-trimethylcyclohexyl) phosphine was dissolved in 300 parts of benzene. To this mixture was added slowly wtih stirring 200 parts of acrolein. The temperature was maintained at 40–50° C. for about 3 hours and the mixture allowed to stand overnight. The mixture was then distilled to remove benzene. The resulting product was a light yellow colored solid.

About 100 parts of the above-described polymer is mixed with ethanol and treated with hydrogen at 100° C. and 1000 p.s.i. pressure in the presence of Raney nickel. During the first three hours, hydrogen is rapidly absorbed and about 70% of the calculated amount of hydrogen is reacted. Hydrogenation is continued for another 10 hours until about 100% of the calculated amount of hydrogen is absorbed. At this time, the product is all soluble in the ethanol. The mixture is then removed from the hydrogenation vessel, filtered and topped at 150° C., 1 mm., to give viscous semi-solid resin having an OH value of about 0.7 eq./100 g. This polyol is then used to form a polyester valuable for coatings.

*Example IV*

300 parts of ethanol and 1 part of trioctyl phosphine are mixed in a reaction vessel. The mixture is kept at 50° C. while 300 parts of acrolein are added. The temperature is kept at 50–60° C. for 4 hours and the mixture then allowed to stand. Removal of the ethanol yields a light yellow colored solid.

Related polymers are obtained by replacing the trioctyl phosphine with the same amount of each of the following: trihexyl phosphine, tridecyl phosphine, tricyclohexyl phosphine and triallyl phosphine.

*Example V*

30 parts of ethanol and 1 part of triphenyl arsine mixed in a reaction vessel. The mixture was kept at 40° C.–50° C. and 200 parts of acrolein slowly added with stirring. The temperature was kept at 50–60° C. for 24 hours and then allowed to stand. Removal of the ethanol yields a light yellow color solid.

About 100 parts of the above-described polymer is mixed with ethanol and treated with hydrogen at 100° C. and 1000 p.s.i. pressure in the presence of Raney nickel. During the first three hours, hydrogen is rapidly absorbed and about 70% of calculated amount of hydrogen is reacted. Hydrogenation is then continued for another 10 hours. At this time, the product is all soluble in the ethanol. The mixture is then removed from the hydrogenation vessel, filtered and topped at 150° C., 1 mm. to give a viscous semi-solid resin having an OH value of about 0.7 eq./100 g.

The polyhydric alcohol produced above is then reacted with phthalic anhydride and cocoanut fatty acids as shown in the preceding example to produce an alkyd useful in preparing baking enamels.

*Example VI*

300 parts of ethanol and 1.5 parts of trioctyl arsine are mixed in a nitrogen blanketed reaction vessel. The mixture is kept at 50° C. and 200 parts of acrolein slowly added. The temperature is kept at 60° C. for several hours and then allowed to stand. Removal of the ethanol yields a transparent solid.

Polymers having related properties are obtained by replacing trioctyl arsine in the above process with equal amounts of each of the following: tricyclohexyl arsine, tridodecyl arsine and trihexenyl arsine.

About 100 parts of the above-described polymer formed from the trioctyl arsine is mixed with ethanol and treated with hydrogen at 150° C. and 2000 p.s.i. pressure in the presence of copper chromite catalyst. In about 13 hours, all of the solid polymer had been converted to a product which dissolved in the ethanol. The mixture is then removed from the hydrogenation vessel, filtered and topped as in the preceding example. The resulting product is a viscous semi-solid resin having an OH value of about 0.69 eq./100 g.

The polyhydric alcohol produced above is then reacted with phthalic anhydride and cocoanut fatty acids as shown in the preceding examples to produce an alkyd useful in preparing baking enamels.

*Example VII*

1.0 part of trioctyl phosphite is dissolved in 300 parts of benzene. To this mixture is slowly added with stirring 200 parts of acrolein. The temperature was maintained at 50° C. for about 4 hours and the mixture allowed to stand overnight. Removal of the benzene yields a light colored solid.

*Example VIII*

1.5 parts of diphenyl phosphite is dissolved in 300 parts of benzene and to this mixture added slowly with stirring about 200 parts of acrolein. The temperature was maintained at 40° C. to 60° C. for several hours and then the mixture allowed to stand. Removal of the benzene yields a light colored solid.

I claim as my invention:

1. A process for preparing oil-soluble polymers from acrolein which comprise contacting the acrolein with a .1% to 10% by weight of a member of the group consisting of phosphines of the formula P(R)₃ wherein R is a monovalent hydrocarbon radical, arsines of the formula As(R)₃ wherein R is a monovalent hydrocarbon radical and phopshites substituted only with monovalent hydrocarbon radicals at a temperature between 0° C. and 100° C.

2. A process as in claim 1 wherein the polymerization is conducted in a solvent containing OH groups.

3. A process as in claim 1 wherein the catalyst is triphenyl phosphine.

4. A process as in claim 1 wherein the catalyst is tricyclohexyl arsine.

5. A process as in claim 1 wherein the catalyst is triphenyl phosphite.

6. A process as in claim 1 wherein the catalyst is tri(3,3,5-trimethylcyclohexyl)phosphine.

7. A process for preparing oil soluble polymers from acrolein which comprises treating the acrolein in an alkanol solvent with from 0.1% to 10% by weight of a phosphine of the formula P(R)$_3$ wherein R is a monovalent hydrocarbon radical at a temperature between 0° C. and 100° C.

References Cited in the file of this patent

UNITED STATES PATENTS 2,675,372     Coover et al. _____ Apr. 13, 1954
2,924,589     Jurgeleit _____ Feb. 9, 1960

OTHER REFERENCES

Horner et al.: Annalen der Chemie, Justus Liebigs, vol. 591, pages 108–117 (1955). (Copy in Scientific Library.)

Jurgeleit: German application Serial No. V6712, printed October 11, 1956 (Kl. 39C Gruppe 2501) 3 pages spec. no dwg.